Patented Apr. 6, 1948

2,439,359

UNITED STATES PATENT OFFICE 2,439,359

PRODUCTION OF AMINOPROPIONITRILES

James K. Dixon, Riverside, Conn., and Elmer W. Cook, New York, N. Y., assignors to American Cyanamid Company, New York, N. Y., a corporation of Maine No Drawing. Application January 8, 1946, Serial No. 639,904

7 Claims. (Cl. 260—464)

The present invention relates to the production of aminonitriles, and more particularly to a method of preparing N-substituted β-aminopropionitriles which conform to the general formula

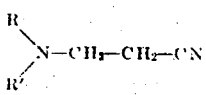

wherein R represents an aliphatic hydrocarbon radical, R' represents either hydrogen or an aliphatic hydrocarbon radical, and R and R' when taken together with the nitrogen atom represent a heterocyclic ring.

It has been discovered that aminonitriles of the above type may be obtained by reacting ethylene cyanohydrin with either a primary or secondary aliphatic amine or a heterocyclic amine which contains a hydrogen atom attached to nitrogen such as, for example, piperidine, morpholine, piperazine and the like.

Typical reactions may be illustrated as follows:

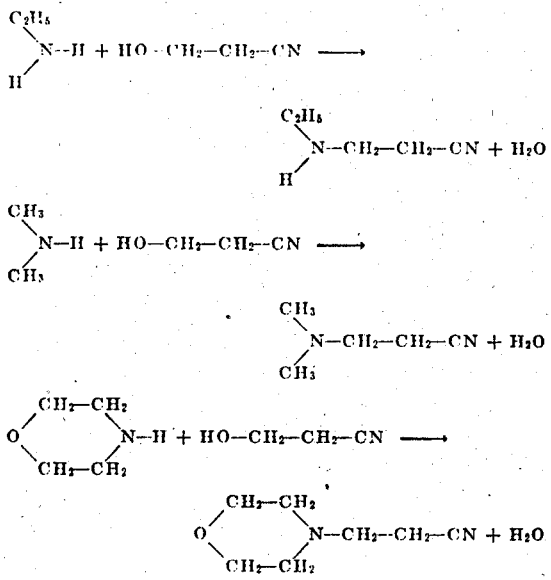

The β-aminopropionitrile is readily produced by passing a mixture of the amine and cyanohydrin in the vapor phase over a dehydration catalyst maintained at a temperature within the range of from about 225° C. to about 450° C.

The dehydration catalyst may include such materials as silica gel, bauxite, alumina, titania, thoria, zirconia and other rare earth oxides or mixtures thereof, and does not involve the use of non-catalytic materials or powerful chemical dehydrating materials such as phosphorus pentoxide for the reaction.

The reactants which are preferably employed in a molar ratio of about 1:1 may be thoroughly mixed in vapor form before entering the reaction zone. The initial mixture may be diluted with an inert carrier such as nitrogen.

The following specific examples will further illustrate the invention.

Example 1

3.24 mols of ethylene cyanohydrin and 3.73 mols of dimethylamine were passed through a mixing tube (vaporizer) held at about 300° C., and then into a vertical stainless steel tube (converter) uniformly heated at 300° C. The lower half of the converter contained 340 cc. of alumina (8-14 mesh), and the upper half served as a pre-heater. The product was condensed in a receiving vessel attached directly to the outlet at the lower end of the converter. A water cooled condenser was attached to the receiver, followed by a dry ice trap (the latter to condense any unreacted amine). The duration of the run was about 80 minutes, and the contact time based on total volume of catalyst was 5 seconds. The product from the receiver was distilled under reduced pressure. β-dimethylaminopropionitrile, B. P. 80° C./20 mm., was obtained in a yield of 81.5% based on the ethylene cyanohydrin used.

Example 2

The procedure of Example 1 was repeated using 3.34 mols of ethylene cyanohydrin and 5.14 mols of mono-ethylamine. Distillation of the reaction product from the receiver gave β-ethylaminopropionitrile, B. P. 86° C./20 mm., in a yield of 77%.

Example 3

The procedure of Example 1 was repeated using 4 mols of ethylene cyanohydrin and 4 mols of allyl amine. Distillation of the product from the receiving vessel gave a 75% yield of β-allylaminopropionitrile boiling at 90° C./20 mm.

Example 4

The procedure of Example 1 was repeated using 4.2 mols of ethylene cyanohydrin and 4.2 mols of piperidine. Distillation of the reaction product gave β-N-piperidinopropionitrile, B. P. 105° C./20 mm., in a yield of 82%.

Example 5

The procedure of Example 1 was repeated using 3.8 mols of ethylene cyanohydrin and 3.8 mols of morpholine. Distillation of the reaction product from the receiver gave an 86% yield of β-N-morpholinopropionitrile boiling at 130° C./20 mm.

Example 6

The procedure of Example 1 was repeated using 3.44 mols of ethylene cyanohydrin, 3.42 mols of dimethylamine, and silica gel as the catalyst in the converter in place of the alumina. Distillation of the product from the receiving vessel gave a 75% yield of β-dimethylaminopropionitrile.

Example 7

The procedure of Example 1 was repeated using 3.48 mols of ethylene cyanohydrin, 3.62 mols of dimethylamine, and zirconia as the catalyst. The converter was maintained at a temperature of about 350° C. Distillation of the product from the receiver gave a 66% yield of β-dimethylaminopropionitrile.

Example 8

The procedure of Example 1 was repeated using 3.48 mols of ethylene cyanohydrin, 4.25 mols of mono-ethylamine, and zirconia as the catalyst maintained at a temperature of from about 350° C. to about 415° C. Distillation of the reaction product from the receiving vessel gave a 44% yield of β-ethylaminopropionitrile.

Example 9

The procedure of Example 1 was repeated using 3.48 mols of ethylene cyanohydrin, 3.60 mols of dimethylamine, and bauxite as the catalyst maintained at a temperature of from 350° C. to 390° C. Distillation of the product from the receiving vessel gave a 63% yield of β-dimethylaminopropionitrile.

The present invention provides a simple and convenient method of preparing a group of compounds which may be employed as intermediates for the production of germicidal agents and assistants for the textile and related industries.

While the invention has been described with particular reference to specific embodiments, it is to be understood that it is not to be limited thereto but is to be construed broadly and restricted solely by the scope of the appended claims.

We claim:

1. A method of producing an N-substituted β-aminopropionitrile which comprises bringing together ethylene cyanohydrin and a compound chosen from the group consisting of a heterocyclic amine which contains a hydrogen atom attached to nitrogen, and an aliphatic amine of the formula

wherein R represents an aliphatic hydrocarbon radical and R' is a member of the group consisting of hydrogen and an aliphatic hydrocarbon radical, in the presence of a dehydration catalyst maintained at a temperature within the range of from about 225° C. to about 450° C.

2. A method of producing an N-substituted β-aminopropionitrile which comprises bringing together ethylene cyanohydrin and a compound chosen from the group consisting of a heterocyclic amine which contains a hydrogen atom attached to nitrogen, and an aliphatic amine of the formula

wherein R represents an aliphatic hydrocarbon radical and R' is a member of the group consisting of hydrogen and an aliphatic hydrocarbon radical, in the presence of alumina maintained at a temperature within the range of 225° C. to 450° C.

3. A method of producing a β-dialkylaminopropionitrile which comprises bringing together ethylene cyanohydrin and a dialkyl amine in the presence of alumina maintained at a temperature within the range of 225° C. to 450° C.

4. A method of producing β-dimethylaminopropionitrile which comprises bringing together ethylene cyanohydrin and dimethylamine in the presence of alumina maintained at a temperature within the range of 225° C. to 450° C.

5. A method of producing an N-substituted β-aminopropionitrile which comprises mixing the vapors of ethylene cyanohydrin and a compound chosen from the group consisting of a heterocyclic amine which contains a hydrogen atom attached to nitrogen, and an aliphatic amine of the formula

wherein R represents an aliphatic hydrocarbon radical and R' is a member of the group consisting of hydrogen and an aliphatic hydrocarbon radical, and passing the mixed vapors over a heated dehydration catalyst maintained at a temperature between about 225° C. and 450° C.

6. A method of producing an N-substituted β-aminopropionitrile which includes the steps of passing a gaseous mixture comprising the vapor of ethylene cyanohydrin and a compound chosen from the group consisting of a heterocyclic amine which contains a hydrogen atom attached to nitrogen, and an aliphatic amine of the formula

wherein R represents an aliphatic hydrocarbon radical and R' is a member of the group consisting of hydrogen and an aliphatic hydrocarbon radical, through a preheating zone and thence through a reaction zone containing a dehydration catalyst maintained at a temperature between about 225° C. and 450° C.

7. A method of producing an N-substituted β-aminopropionitrile which comprises mixing the vapors of ethylene cyanohydrin and a compound chosen from the group consisting of a heterocyclic amine which contains a hydrogen atom attached to nitrogen, and an aliphatic amine of the formula

wherein R represents an aliphatic hydrocarbon radical and R' is a member of the group consisting of hydrogen and an aliphatic hydrocarbon radical, passing the mixed vapors through a preheating zone and thence through a reaction zone containing a dehydration catalyst maintained at a temperature between about 225° C. and about 450° C., condensing the resulting product and recovering the N-substituted β-aminopropionitrile therefrom.

JAMES K. DIXON.
ELMER W. COOK.

REFERENCES CITED

The following references are of record in the file of this patent:

UNITED STATES PATENTS

| Number | Name | Date |
|---|---|---|
| 1,992,615 | Hoffman et al. | Feb. 26, 1935 |
| 2,211,152 | Nicodemus et al. | Aug. 13, 1940 |
| 2,228,271 | Jacobson et al. | Jan. 14, 1941 |
| 2,328,940 | Alderson et al. | Sept. 7, 1943 |
| 2,364,538 | Kirk et al. | Dec. 5, 1944 |
| 2,374,052 | Spence et al. | Apr. 17, 1945 |

FOREIGN PATENTS

| Number | Country | Date |
|---|---|---|
| 496,372 | Germany | Apr. 24, 1930 |